United States Patent
Bellows et al.

(10) Patent No.: US 10,965,929 B1
(45) Date of Patent: Mar. 30, 2021

(54) DEPTH MAPPING AND PARALLEL DISTORTION CORRECTION FOR MIXED REALITY

(71) Applicant: Rockwell Collins, Inc., Cedar Rapids, IA (US)

(72) Inventors: Peter R. Bellows, Marion, IA (US); Danilo P. Groppa, Pasadena, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 23 days.

(21) Appl. No.: 16/239,808

(22) Filed: Jan. 4, 2019

(51) Int. Cl.
*H04N 13/128* (2018.01)
*H04N 13/204* (2018.01)
*G02B 27/01* (2006.01)
*G06T 19/00* (2011.01)

(52) U.S. Cl.
CPC ......... *H04N 13/128* (2018.05); *G02B 27/017* (2013.01); *G06T 19/006* (2013.01); *H04N 13/204* (2018.05)

(58) Field of Classification Search
CPC .. H04N 13/128; H04N 13/204; G02B 27/017; G06T 19/006
See application file for complete search history.

(56) References Cited

U.S. PATENT DOCUMENTS

| | | | | |
|---|---|---|---|---|
| 5,949,432 A | * | 9/1999 | Gough | G06F 3/0481 345/629 |
| 10,510,155 B1 | * | 12/2019 | Islam | G06T 7/70 |
| 2002/0075715 A1 | * | 6/2002 | Kwon | H03M 13/6566 365/51 |
| 2007/0083114 A1 | * | 4/2007 | Yang | G06T 5/50 600/437 |
| 2009/0087115 A1 | * | 4/2009 | Wong | G06T 5/006 382/255 |
| 2015/0379720 A1 | * | 12/2015 | Herraez | H04N 13/261 348/43 |
| 2016/0012567 A1 | * | 1/2016 | Siddiqui | G06T 7/593 382/154 |
| 2017/0004649 A1 | * | 1/2017 | Collet Romea | G06T 17/00 |
| 2017/0206689 A1 | * | 7/2017 | Eo | H04N 9/646 |
| 2017/0318280 A1 | * | 11/2017 | Nisenzon | H04N 13/271 |
| 2018/0116518 A1 | * | 5/2018 | Rinck | G01R 33/283 |
| 2018/0124371 A1 | * | 5/2018 | Kamal | G01B 11/00 |
| 2019/0102178 A1 | * | 4/2019 | Zbiciak | G06F 9/30112 |
| 2019/0155372 A1 | * | 5/2019 | Cuervo | G06T 1/60 |
| 2020/0090358 A1 | * | 3/2020 | Sun | G06T 7/337 |

* cited by examiner

*Primary Examiner* — Abderrahim Merouan
(74) *Attorney, Agent, or Firm* — Suiter Swantz pc llo

(57) ABSTRACT

A video processing device for a mixed reality system is disclosed. A mixed reality system may include a computer system configured to generate a virtual reality video stream and a head mounted device communicatively coupled to the computer system. The head mounted device may include a display, a depth sensor, and a stereoscopic camera system. The video processing device can be communicatively coupled to the computer system and the head mounted device. The video processing device can be configured to employ confidence-based fusion for depth mapping and/or exploit parallelism in high-speed video distortion correction.

17 Claims, 16 Drawing Sheets

_US 10,965,929 B1_

DEPTH MAPPING AND PARALLEL DISTORTION CORRECTION FOR MIXED REALITY

BACKGROUND

Mixed reality (MR) is a rapidly-developing display technology for training and simulation markets, with uniquely demanding computer vision performance requirements. Mixed reality often uses a virtual reality (VR) head-worn display, with a fully occluded and/or fully digital display; however, head-mounted cameras are also included to bring in first-person, live views of real people and objects from the real world around the user. The live and virtual elements are selectively blended, on-the-fly, to generate a single blended, immersive scene to the user. To do so, the system must draw cues from the scene about which elements in the live scene are "foreground" that should appear in the mixed reality scene, and which elements are "background" that should be obscured by the virtual background. A true solution to this blending should be capable of decisions about "dynamic occlusion", where live vs. virtual objects in the scene are selectively drawn "on top", depending on relative position to the viewer.

First-generation mixed reality systems used chroma key (e.g., "green screen") and other outdated technologies for real-time identification of background pixels. For example, any pixel in the camera view that matched the chroma key green color was replaced with the corresponding virtual pixel. This crude approach, however, does not provide the dynamic occlusion capability discussed above, and can be a significant logistical burden to set up. A more complete solution is needed for today's dynamic, immersive training content.

SUMMARY

In an aspect, embodiments of the inventive concepts disclosed herein are directed to a video processing device for a mixed reality system that employs confidence-based fusion for depth mapping. In embodiments, the mixed reality system includes a computer system configured to generate a virtual reality video stream and a head mounted device communicatively coupled to the computer system. In embodiments, the head mounted device includes a display, a depth sensor, and a stereoscopic camera system. The video processing device can be communicatively coupled to the computer system and the head mounted device. In embodiments, the video processing device may be configured to: generate a first depth map based on time-of-flight measurements detected by a depth sensor of a head mounted device; generate a second depth map based on disparity mapping from stereo imagery detected by the stereoscopic camera system of the head mounted device; determine confidence values for respective pixel locations in the first depth map and the second depth map based on texture recognition; blend the first depth map and the second depth map into a combined depth map based on the confidence values of the respective pixel locations in the first depth map and the second depth map; and combine the virtual reality video stream with the stereo imagery detected by the stereoscopic camera system based on the combined depth map and depth criteria encoded into the virtual reality video stream. The resulting blended video is then rendered to the user head-mounted display.

In another aspect, embodiments of the inventive concepts disclosed herein are directed to a distortion corrector that exploits parallelism in high-speed video distortion correction. The video processing device may include the distortion corrector (e.g., in the form of hardware, software, and/or firmware). In embodiments, the distortion corrector includes a sparse matrix table, a sparse matrix table interface, an address bi-linear interpolator, and a pixel buffer. The sparse matrix table may include pixel-by-pixel coordinate mappings decimated by a selected rate. The sparse matrix table interface may be configured to fetch a subset of the coordinate mappings from the sparse matrix table for interpolation. The address bi-linear interpolator may be configured to calculate one or more input image coordinates for one or more pixels. The pixel buffer may be configured to buffer a subset of pixels for an output image, fetch the one or more pixels based on the one or more input image coordinates, and interpolate the one or more pixels to produce one or more output image pixels. In embodiments, the pixel buffer is configured with a dual-bank, virtual addressing scheme that enables multiple independent neighborhood fetches of pixels in parallel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
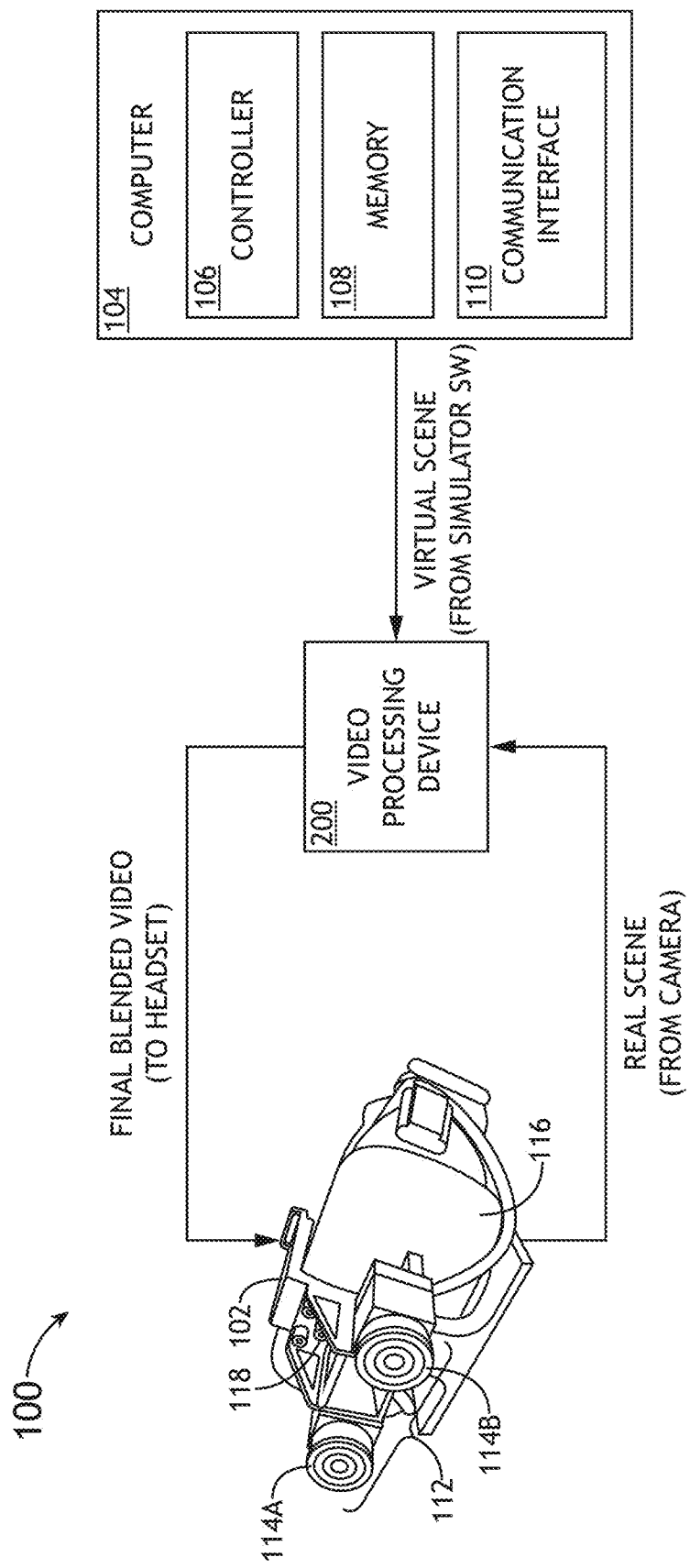
FIG. 1A is a block diagram of a mixed reality system that includes a video processing device, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a video processing device for a mixed reality system that employs confidence-based fusion for depth mapping and/or exploits parallelism in high-speed video distortion correction.

Mixed reality (MR) is a rapidly-developing display technology for training and simulation markets, with uniquely demanding computer vision performance requirements. Mixed reality often uses a virtual reality (VR) head-worn display, with a fully occluded and/or fully digital display; however, head-mounted cameras are also included to bring in first-person, live views of real people and objects from the real world around the user. The live and virtual elements are selectively blended, on-the-fly, to generate a single blended, immersive scene to the user. To do so, the system must draw cues from the scene about which elements in the live scene are "foreground" that should appear in the mixed reality scene, and which elements are "background" that should be obscured by the virtual background. A true solution to this blending should be capable of decisions about "dynamic occlusion", where live vs. virtual objects in the scene are selectively drawn "on top", depending on relative position to the viewer.

First-generation mixed reality systems used chroma key (e.g., "green screen") and other outdated technologies for real-time identification of background pixels. For example, any pixel in the camera view that matched the chroma key green color was replaced with the corresponding virtual pixel. This crude approach, however, does not provide the dynamic occlusion capability discussed above, and can be a significant logistical burden to set up. A more complete solution is needed for today's dynamic, immersive training content.

A more modern approach is to generate a live "point cloud," that is, a full 3-D map of the user's view of the physical scene, using some means of sensing the depth (e.g., physical distance from the viewer) of each pixel. This allows the system to make the dynamic occlusion decisions discussed above (e.g., drawing the virtual vs. physical object on top, depending on relative position). This requires a significant computational load to keep up with the high resolution (e.g., 4K and beyond) and frame rate (e.g., 90 Hz and beyond) of next-generation VR displays. Standard 3D computer vision algorithms, such as disparity mapping, are too computationally intensive to keep up with VR video bandwidth, particularly in the SWAP-constrained context of head-worn computing. Time-of-flight (ToF) infrared depth sensors provide a promising approach for generating this depth map at these rates. These are active sensors that scan an infrared (IR) pattern across the field of view and detect the depth of each pixel based on the phase difference in the returned signal. Such depth sensors can process at relatively high frame rates (e.g., 90 Hz or more); however, they are inherently lower resolution. For instance, the best of today's consumer-grade infrared sensors has no more than VGA resolution. This is far lower than the resolution needed for a MR point cloud. Furthermore, ToF sensors do not get a good return from certain scenery, depending particularly on texture and angle of incidence. Highly reflective materials, particularly at high angle of incidence, do not scatter enough of the IR wave back to the sensor to detect depth. Such regions then are falsely measured to be at far distance, because of the lack of return. Other factors, such as other IR light sources in the scene, and multi-path reflections, can also contribute to incorrect depth measurements in the ToF signal.

This disclosure provides a hybrid sensor solution to the real-time MR depth-mapping problem. In embodiments, a ToF IR sensor is used to provide a low-resolution depth map at high frame rate. A secondary mode of depth measurement, such as disparity mapping on downsampled stereo imagery, is also used. Then, with texture detection/recognition, a confidence value is assigned to different regions of the depth measurements, and the two depth estimates are combined to single, confidence-based depth map of the scene. The merged depth map is then upsampled to the full VR resolution, using a fusion algorithm that maps the data to visible features in the RGB imagery. This approach blends the strengths of both traditional stereoscopic vision and ToF sensors, and is capable of performing at the throughput rates required for MR.

FIG. 1A illustrates an example embodiment of a MR system 100. In embodiments, the MR system 100 includes a computer system 104 configured to generate a VR video stream and a head mounted device 102 communicatively coupled to the computer system 104. In embodiments, the head mounted device 102 includes a head-worn display 116 (e.g., LCD, LED display, OLED display, or the like). The periphery of the display 116 may be occluded so that light cannot enter from the periphery of the display 116 when the head mounted device 102 is worn by a user. The head mounted device 102 further includes a stereoscopic camera system 112, which may include a first camera/sensor 114A and a second camera/sensor 114B configured to detect stereo imagery. The first camera/sensor 114A and the second camera/sensor 114B may be configured to detect respective video streams that are then combined to generate the stereo imagery (e.g., a stereo video stream or series of stereo images). The head mounted device 102 further includes a depth sensor 118, such as an infrared depth sensor, light imaging, detection, and ranging (LIDAR) sensor, or the like. As described herein, the MR system 100 can employ the depth sensor 118 and the stereoscopic camera system 112 to generate a confidence-based depth map that leverages depth measurements from both sources of information.

In embodiments, the computer system 104 includes a controller 106, memory 108, and a communication interface 110. The controller 106 provides processing functionality for at least the computer system 104 and can include any number of processors, micro-controllers, circuitry, field programmable gate array (FPGA) or other processing systems, and resident or external memory for storing data, executable code, and other information accessed or generated by the computer system 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

The memory 108 can be an example of tangible, computer-readable storage medium that provides storage functionality to store various data and/or program code associated with operation of the computer system 104/controller 106, such as software programs and/or code segments, or other data to instruct the controller 106, and possibly other components of the computer system 104, to perform the functionality described herein. Thus, the memory 108 can store data, such as a program of instructions for operating the computer system 104, including its components (e.g., controller 106, communication interface 110, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 110 can be operatively configured to communicate with components of the computer system 104. For example, the communication interface 110 can be configured to retrieve data from the controller 106 or other devices (e.g., head mounted device 102, video processing device 200, etc.), transmit data for storage in the memory 108, retrieve data from storage in the memory 108, and so forth. The communication interface 110 can also be communicatively coupled with the controller 106 to facilitate data transfer between components of the computer system 104 and the controller 106. It should be noted that while the communication interface 110 is described as a component of the computer system 104, one or more components of the communication interface 110 can be implemented as external components communicatively coupled to the computer system 104 via a wired and/or wireless connection. The computer system 104 can also include and/or connect to one or more input/output (I/O) devices (e.g., via the communication interface 110), such as video processing device 200, display 116, one or more sensors (e.g., stereoscopic camera system 112, depth sensor 118, etc.), an output device (e.g., computer display(s), speaker(s), etc.), an input device (e.g., a mouse, a trackball, a trackpad, a joystick, a touchpad, a touchscreen, a keyboard, a keypad, a microphone (e.g., for voice commands)), and so forth. In embodiments, the communication interface 110 includes or is coupled to a transmitter, receiver, transceiver, physical connection interface, or any combination thereof.

In embodiments, the MR system 100 further includes a video processing device 200 communicatively coupled to the computer system 104 and the head mounted device 102. The video processing device 200 may include hardware (e.g., circuitry, one or more integrated circuits (ICs), one or more programmable controllers/devices, etc.), software (program modules, control logic, etc.), and/or firmware that is coupled to (e.g., physically attached to) or integrated within (e.g., at least partially embedded in) the head mounted device 102. In other embodiments, the video processing device 200 is instead coupled to or integrated within the computer system 104. In other embodiments, some portions of the video processing device/system 200 are coupled to or integrated within the head mounted device 102 and some portions of the video processing device/system 200 are coupled to or integrated within the computer system 104.

Figure 1B:
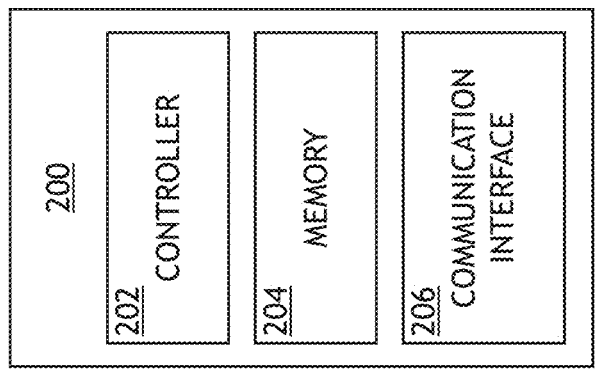
FIG. 1B is a block diagram of the video processing device, in accordance with example embodiments of this disclosure.

As shown in FIG. 1B, the video processing device 200 may include a controller 202, memory 204, and a communication interface 206. The controller 202 provides processing functionality for at least the video processing device 200 and can include any number of processors, micro-controllers, circuitry, field programmable gate array (FPGA) or other processing systems, and resident or external memory for storing data, executable code, and other information accessed or generated by the video processing device 200. The controller 202 can execute one or more software programs embodied in a non-transitory computer readable medium (e.g., memory 204) that implement techniques described herein. The controller 202 is not limited by the materials from which it is formed or the processing mechanisms employed therein and, as such, can be implemented via semiconductor(s) and/or transistors (e.g., using electronic integrated circuit (IC) components), and so forth.

The memory 204 can be an example of tangible, computer-readable storage medium that provides storage functionality to store various data and/or program code associated with operation of the video processing device 200/controller 202, such as software programs and/or code segments, or other data to instruct the controller 202, and possibly other components of the video processing device 200, to perform the functionality described herein. Thus, the memory 204 can store data, such as a program of instructions for operating the video processing device 200, including its components (e.g., controller 202, communication interface 206, etc.), and so forth. It should be noted that while a single memory 204 is described, a wide variety of types and combinations of memory (e.g., tangible, non-transitory memory) can be employed. The memory 204 can be integral with the controller 202, can comprise stand-alone memory, or can be a combination of both. Some examples of the memory 204 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 can be operatively configured to communicate with components of the video processing device 200. For example, the communication interface 206 can be configured to retrieve data from the controller 202 or other devices (e.g., head mounted device 102, video processing device 200, etc.), transmit data for storage in the memory 204, retrieve data from storage in the memory 204, and so forth. The communication interface 206 can also be communicatively coupled with the controller 202 to facilitate data transfer between components of the video processing device 200 and the controller 202. It should be noted that while the communication interface 206 is described as a component of the video processing device 200, one or more components of the communication interface 206 can be implemented as external components communicatively coupled to the video processing device 200 via a wired and/or wireless connection. The video processing device 200 can also include and/or connect to one or more input/output (I/O) devices (e.g., via the communication interface 206), such as computer system 104, display 116, one or more sensors (e.g., stereoscopic camera system 112, depth sensor 118, etc.), an output device (e.g., computer display(s), speaker(s), etc.), an input device (e.g., a mouse, a trackball, a trackpad, a joystick, a touchpad, a touchscreen, a keyboard, a keypad, a microphone (e.g., for voice commands)), and so forth. In embodiments, the communication interface 206 includes or is coupled to a transmitter, receiver, transceiver, physical connection interface, or any combination thereof.

In embodiments, the video processing device 200/controller 202 is configured to generate a first depth map based on ToF measurements detected by the depth sensor 118. For example, the video processing device 200/controller 202 can be configured to use ToF measurements for real-time/near real-time point cloud generation at MR-capable frame rates.

The video processing device 200/controller 202 can be further configured to generate a second depth map based on disparity mapping from stereo imagery detected by the stereoscopic camera system 112. For example, the video processing device 200/controller 202 may be configured to generate a secondary depth map estimate based on disparity mapping from the stereo imagery detected by camera/sensor 114A and camera/sensor 114B. In some embodiments, the video processing device 200/controller 202 is configured to downsample the stereo imagery before generating the second depth map, in order to reduce the computation load so that the disparity mapping algorithm(s)/process(es) can keep up with the framerate of the stereo imagery.

After generating the first depth map based on ToF measurements and the second depth map based on disparity mapping, the video processing device 200/controller 202 can apply confidence metrics to rate the probability of error at each pixel location in both depth maps. For example, the video processing device 200/controller 202 can be configured to determine confidence values for respective pixel locations in the first depth map and the second depth map based on texture recognition/detection. In some embodiments, the confidence values are based on recognition of textures that are unlikely to produce a good estimate in the different sensor domains.

The video processing device 200/controller 202 is further configured to blend the first depth map and the second depth map into a combined depth map based on the confidence values of the respective pixel locations in the first depth map and the second depth map. For example, the video processing device 200/controller 202 can perform a depth map blending process that produces a single (combined) depth map, registered to the field of view of the cameras/sensors 114A and 114B of the stereoscopic camera system 112. In some embodiments, the video processing device 200/controller 202 is configured to draw from the highest confidence depth estimate at each pixel location.

In some embodiments, the video processing device 200/controller 202 is configured to upsample the combined depth map to a resolution of the VR video stream before combining the VR video stream with the stereo imagery detected by the stereoscopic camera system 112. For example, the video processing device 200/controller 202 can be configured to perform a noise-aware upsampling algorithm that scales the relatively low-resolution depth map to the higher-resolution of the VR video stream or cameras/sensors 114A and 114B. In embodiments, the algorithm causes the video processing device 200/controller 202 to merge the depth map with optical cues from the high-resolution camera images to ensure a precise alignment of the depth map to physical edges of objects in the scene, for accurate extraction of identified foreground objects based on distance.

The video processing device 200/controller 202 is configured to then combine the VR video stream with the stereo imagery detected by the stereoscopic camera system 112 based on the combined depth map and depth criteria encoded into the VR video stream. In embodiments, this depth-based blending supports dynamic occlusion. Furthermore, the video processing device 200/controller 202 may include a low-latency pipeline that enables all of this processing to occur at a 90 Hz or greater frame rate (e.g., 11 ms or lower total processing time).

In embodiments, the video processing device 200 allows for the depth-based MR capability described herein to be attached to third party commercial off-the-shelf (COTS) VR systems to produce the MR effect with no modifications to the COTS technology. For example, in some embodiments, the computer system 104 is configured to encode the depth criteria into the VR video stream generated by COTS software, and the video processing device 200 is configured to decode the depth criteria from the VR video stream in order to properly merge the stereo imager with the VR video stream.

Figure 2A:
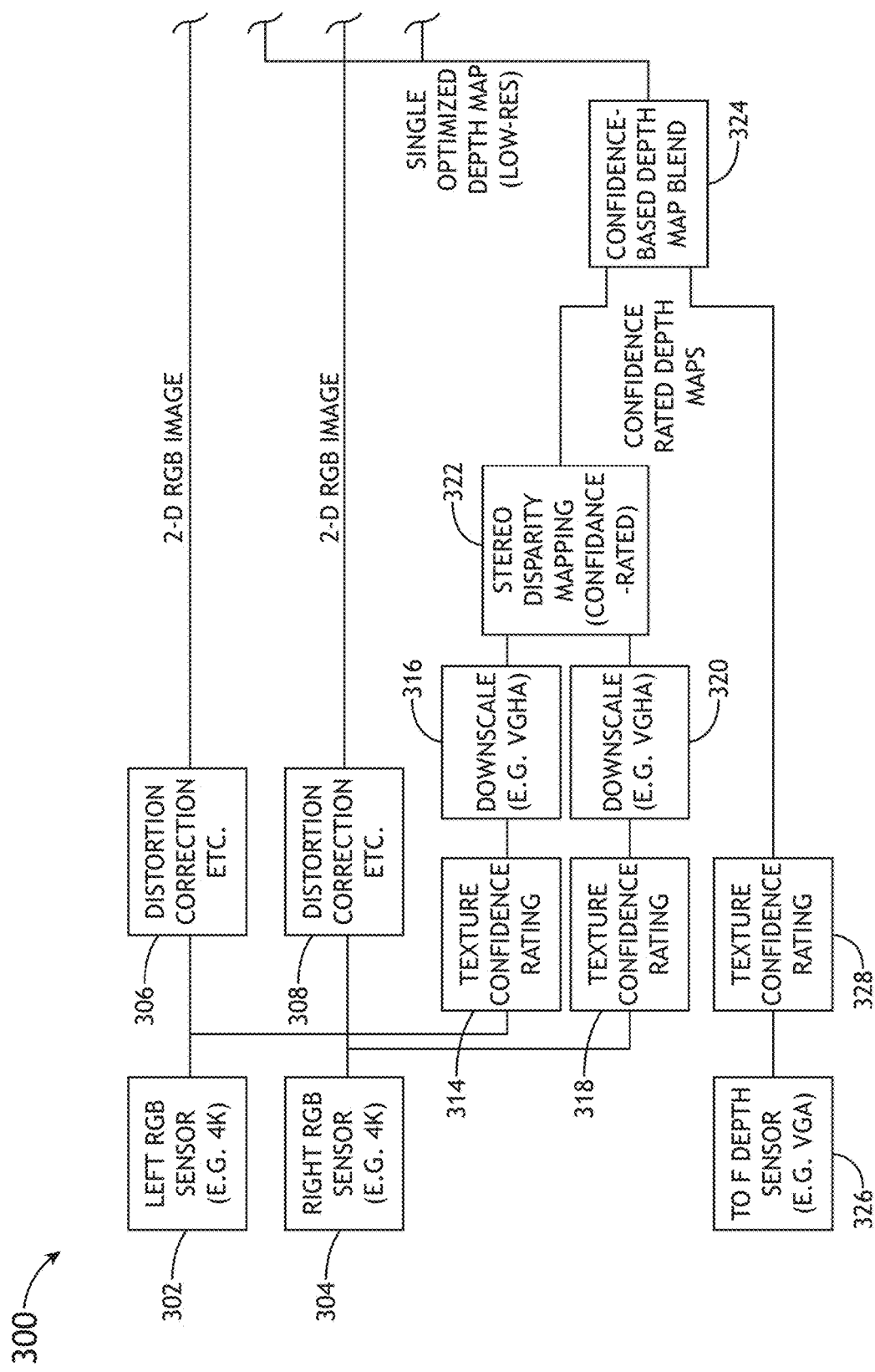
FIGS. 2A and 2B illustrate a process that can be performed by the video processing device, in accordance with example embodiments of this disclosure.
Figure 2B:
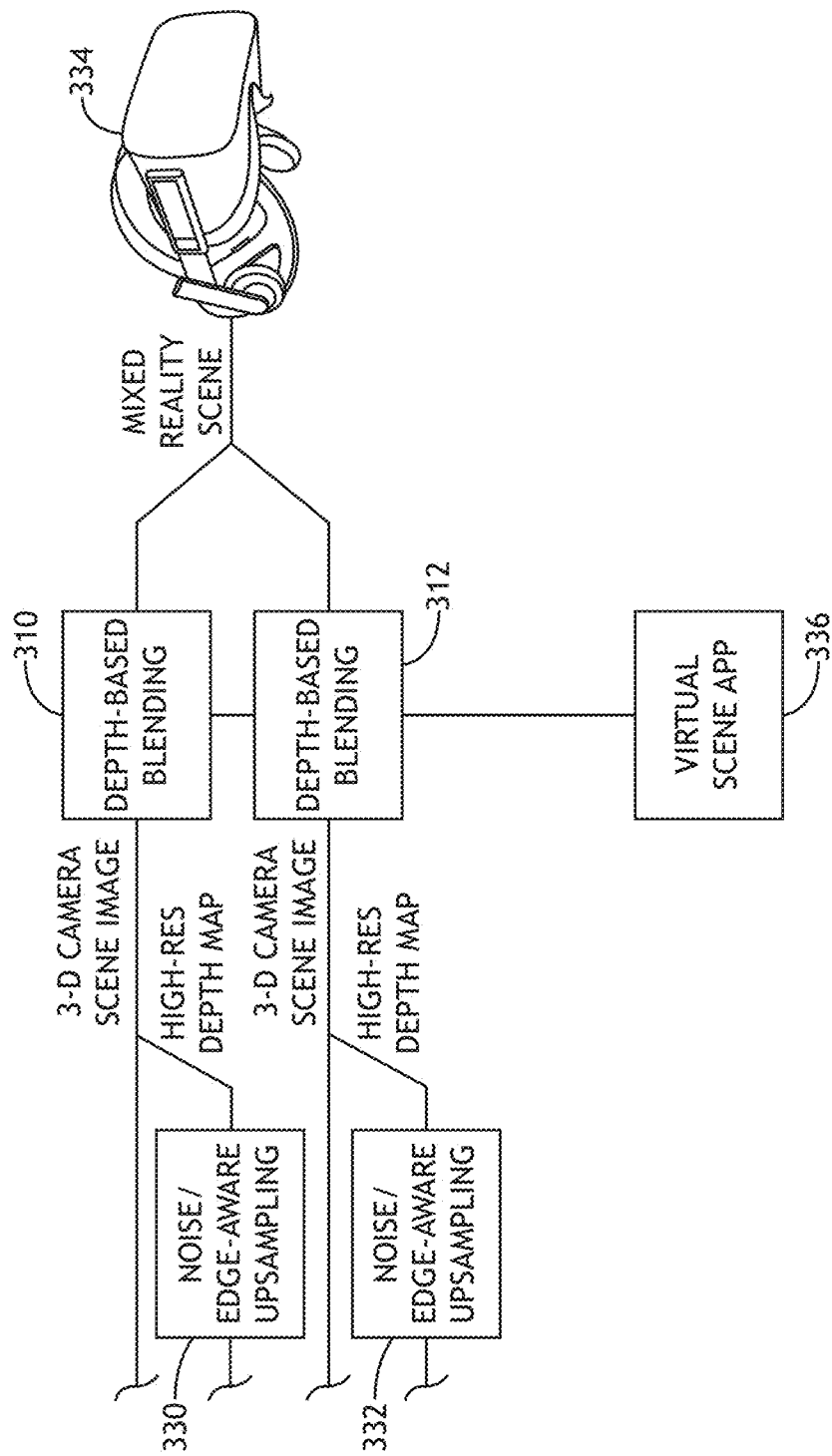

FIGS. 2A and 2B illustrate a flow diagram of a process 300 for the confidence-based fusion approach for depth mapping. In embodiments, the MR system 100 including the video processing device 200 described herein can be configured to perform the process 300. In some embodiments, one or more steps or operations can additionally or alternatively be performed by other components (e.g., additional computer systems, controllers, processors, servers, cloud computing systems, etc.).

In implementations, the video processing device 200 receives sensor feeds from the cameras/sensors 114A and 114B (e.g., dual RGB cameras) of the stereoscopic camera system 112, which provide stereo imagery of the "live" user view (blocks 302 and 304). The video processing device 200 also receives measurements or video of the live user view from the depth sensor 118 (e.g., ToF measurements) for creating the point cloud data (block 326).

The camera feeds are processed with algorithms such as distortion correction, white balance, gamma correction, and other standard functions to make the "real" scene look right to the user (blocks 306 and 308). The video feeds from the cameras/sensors 114A and 114B may also be downsampled, if needed, to allow computation of a real-time disparity map (blocks 316 and 320). This may be necessary because disparity mapping is typically too computationally intensive to be computed in real-time at full resolution for VR-required frame rates.

The video processing device 200 performs disparity mapping on the stereo imagery to provide a first estimate of the depth map (e.g., a first depth map) for the scene (block 322). This map is registered to the frame of reference of the ToF filter, to give proper alignment of the two estimated depth maps.

The video processing device 200 also applies texture detection filters, to provide a confidence value at every pixel for the reliability of the depth map (blocks 314 and 318). Texture filters may detect conditions such as: very flat or homogenous texture; highly speckled textures; low signal-to-noise ratio (i.e. due to poorly lit scenes, or high sensor noise); and so forth. Each of these conditions reduces the ability of the disparity mapping function to find reliable visual features to correlate between the left and right eyes in order to estimate depth. Features such as these would be assigned lower confidence values.

The video processing device 200 also generates a second estimate for the depth of the live scene (e.g., a second depth map) based on measurements (e.g., ToF measurements) performed by the depth sensor 118 (block 326). Texture filters are also applied to the ToF depth map for a confidence rating (block 328). In some implementations, these filters are unique to the IR phase domain used by the depth sensor 118 (e.g., infrared camera/sensor). These filters can include both temporal and spatial filters to detect noise, looking particularly for large depth discontinuities across small regions.

Textures may also be detected in the RGB domain to vote down the confidence in the IR depth measurement; for example, depth discontinuities detected on a surface that appears flat in the RGB domain are likely noise. These types of discontinuities are common to ToF sensors today and provide disorienting errors in the MR scene to the user. By fusing the information readily available in the two domains, the depth estimate can be highly refined.

Fusion of the two depth map estimates into a combined depth map is performed in the next step, where the two depth estimates are merged to provide a combined, confidence-based depth map (block 324). The video processing device 200 is configured to blend the first depth map and the second depth map into a combined depth map based on the confidence values of the respective pixel locations in the first depth map and the second depth map. For example, the two depth maps can be blended, choosing the highest-confidence estimate at each point. This blending function may be neighborhood-oriented (e.g. a dilation operation with Gaussian weights), so that the depth measurements and confidence values of neighboring pixels are factored in, to reduce noise anomalies in the resulting depth map.

At this point a refined depth map (i.e., the combined depth map) has been generated, but it may be low-resolution compared to the RGB point cloud to be rendered. Thus, a critical step in finishing the process may be the use of an intelligent algorithm to upsample the depth map, in a manner that maps as closely as possible to objects in the high-resolution scene. In implementations, the video processing device 200 is configured to upsample the combined depth map to a resolution of the VR video stream before combining the VR video stream with the stereo imagery detected by the stereoscopic camera system 112 (blocks 330 and 332). A promising baseline approach that may be used is the Noise-Aware Filter for Real-Time Depth Upsampling (NAFDU) algorithm, published by Stanford University. This blending function is spatially aware, mapping surfaces in the depth map to surfaces in the RGB image, to ensure edge alignment and also to reduce noise in the depth map. The upsampling operation uses similar neighborhood operators, with adjustable kernel sizes to eliminate interpolation errors. The upsampling step includes an image registration, that distorts the depth map to the field of view of the RGB sensors so that there is a 1:1 correlation of pixel coordinates between the depth and RGB planes. In some implementations, this registration must be uniquely performed to the left-eye vs. right-eye images.

Once the depth map has been upsampled and registered, it is combined with the original RGB data to make 3D point cloud (2D+depth map) data (blocks 310 and 312). This data is then blended with the virtual scene data; the virtual scene is also received as 2D+depth map data from the virtual graphics engine, based on its 3-D model of the scene (block 336). The video processing device 200 blends the live stereo imagery and virtual graphics (e.g., VR video stream/scenery), using the depth mapping in both sets of data to make occlusion decisions at each pixel location (block 334). In some implementations, the video processing device 200 is configured to choose between the VR video stream or the stereo imagery based on which entity is closer.

There are two additional considerations. First, the processing pipeline is designed to support ultra-low-latency processing, which may be necessary for MR. Latency from "photon-to-pixel" (i.e., from the time lights hits the cameras to when the blended image is displayed to the user) may be crucial to ensuring immersion without motion sickness due to lag. Typical requirements are for about 20 ms total latency or less, most of which ends up being consumed by video transport and display latencies, leaving only a few milliseconds available for the video processing algorithms. Each of the fundamental operations involved in the process—image registration/distortion correction, texture filtering, NAFDU/upscaling, confidence-based merging of depth maps, and depth-based video blending—operates on either single pixels or local neighborhoods. This means that the entire process can be pipelined, making it well-suited to streaming architectures based on FPGAs or other SWAP-C-efficient embedded devices. The system may not require a full frame buffer; at most, a few lines of image need to be buffered in order to perform the necessary neighborhood operations. Thus, the net latency of the processing is just the buffering time required to form the appropriately-sized neighborhood.

The other consideration is integration with existing commercial VR/MR systems. As discussed above, this video processing device/system 200 may be implemented in a post-processing black-box that modifies the output from the VR graphics engine, without requiring knowledge or support from the VR engine. The resulting mixed reality video can be streamed directly to the user head mounted device 102, without further processing. As such, this depth-based mixed reality capability can be bolted on to regular COTS VR devices, with no modification. This means that COTS systems, such as the OCULUS RIFT, HTC VIVE, and the like, designed only for VR, could be upgraded with the video processing device 200 to add the depth-based MR capability described herein. Software layers (e.g., the VR SDK and the graphics drivers) may remain unmodified.

Figure 3A:
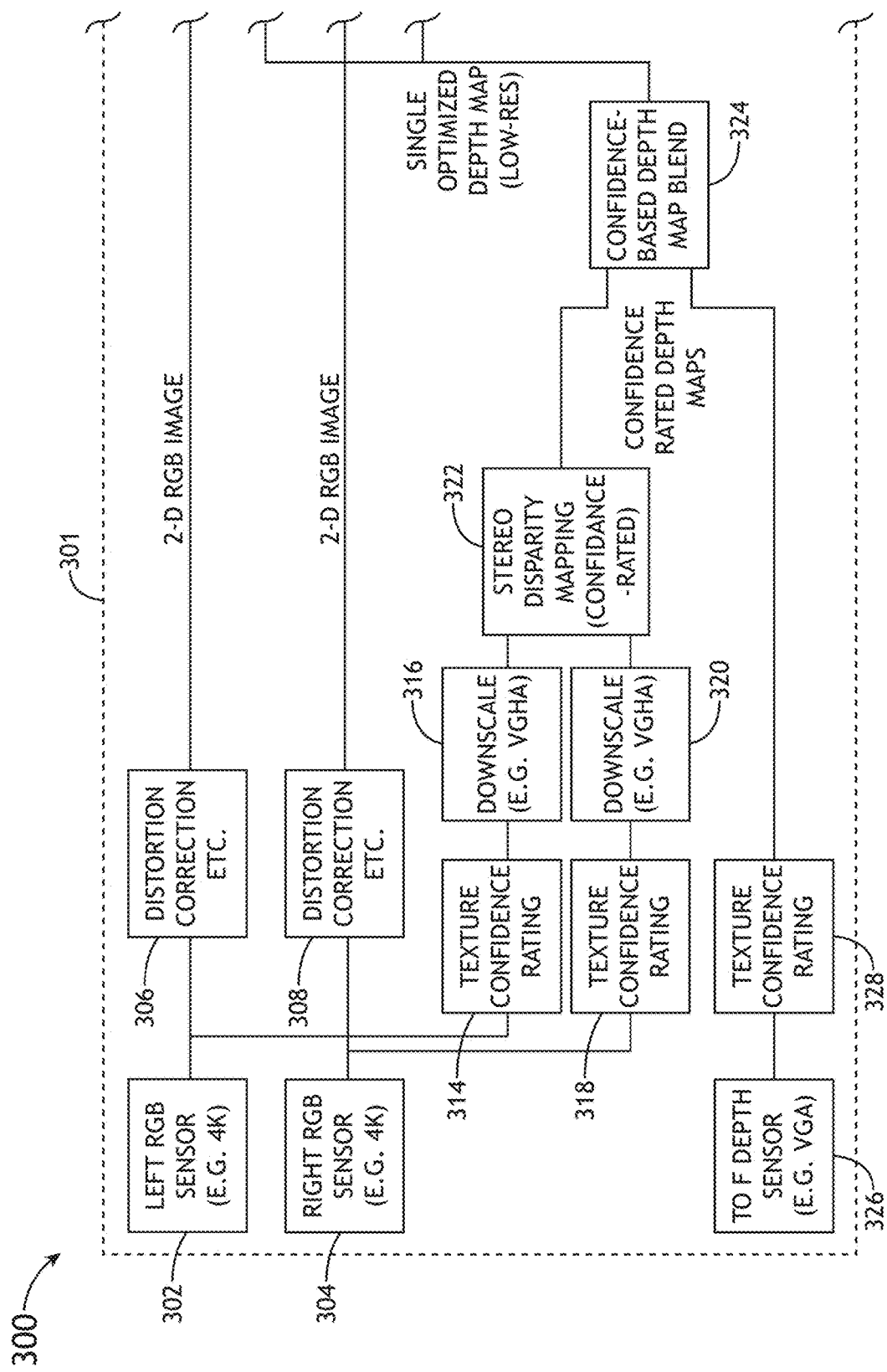
FIGS. 3A and 3B illustrate a process that can be performed by the video processing device, in accordance with example embodiments of this disclosure.
Figure 3B:
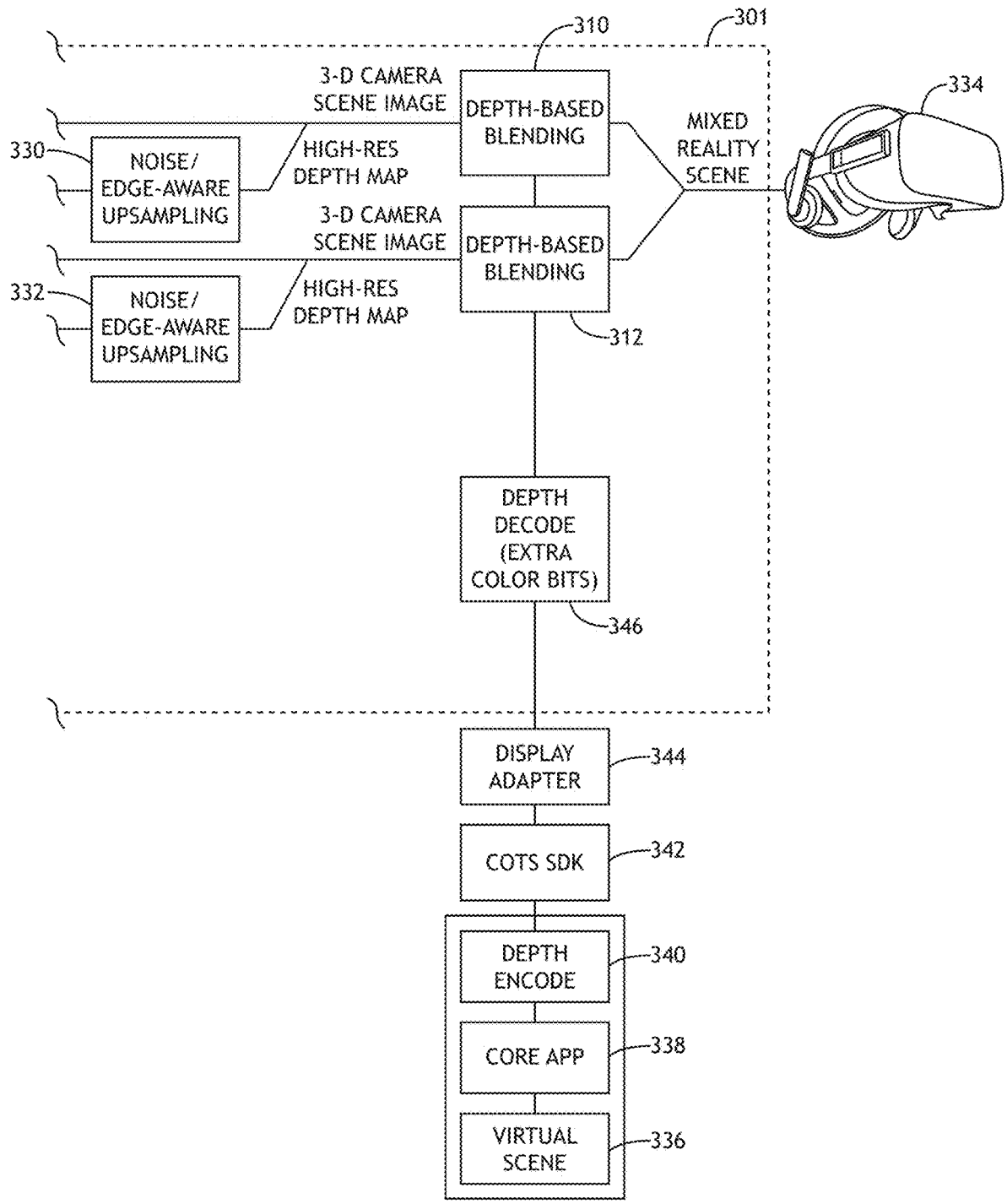

FIGS. 3A and 3B illustrated another implementation of the process 300 with modifications for integration with a COTS system. In implementations, depth-based MR applications 338 may be coded specifically for the COTS platform 342 in order to take advantage of the capability. In particular, an encoding scheme 340 can be used to embed depth information into the VR video stream 336, since depth isn't normally encoded into the video stream. One approach is to encode the depth information as additional bits of color depth. For example, instead of using 8-bit color, the application could request 10-bit color, using the additional 6 bits total (2 bits×3 color channels) to encode depth. 12-bit color would provide 12 bits for encoding depth. The blending pipeline (at the video processing device 301) would be designed to decode the RGB vs. depth values from the color bits accordingly (block 346). It is noted that the VR SDKs and graphics drivers tend to modify scene colors outside of application control, to automatically create effects like dithering. Thus, such systems may need be configured to turn off such effects, or provide a robust encoding that preserves this information even if the effects are applied.

In embodiments, the video processing device 200 includes and/or is configured with (e.g., programmed with) a distortion corrector that exploits parallelism in high-speed video distortion correction. Distortion correction is a fundamental operation to image processing and computer vision applications. As its name implies, distortion correction is commonly applied to counteract various effects of lens curvature in optical systems (e.g., "fisheye", chromatic aberration, multi-sensor registration, and so forth) to restore an image to its "original state" for viewing or for further processing steps. More generally, distortion correction can be considered a coordinate transform function suitable for broader image processing functions, such as scaling/skew, cropping, rotation, image registration (for alignment or fusion of disparate sensors), and so forth.

Figure 4:
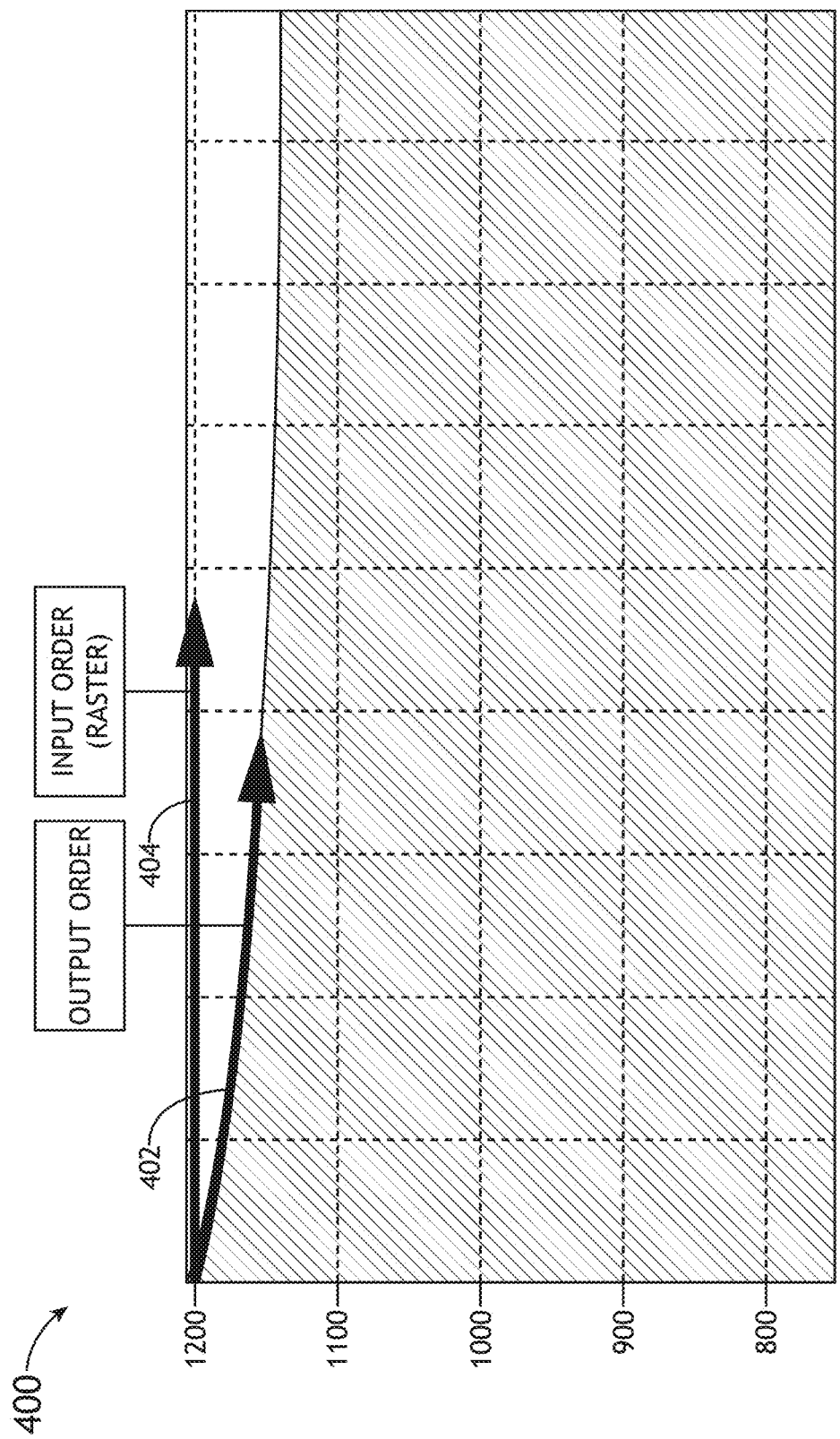
FIG. 4 illustrates non-linear pixel access order for an image, in accordance with example embodiments of this disclosure.

Unfortunately, distortion correction is computationally demanding, particularly as it relates to memory bandwidth. Each pixel of output requires multiple pixels from the input image in order to get accurate sub-pixel interpolation. Moreover, the memory access pattern for these fetches tends to be somewhat random, for example, as shown in FIG. 4. This example shows a case of significant vertical curvature introduced by lens distortion. As shown in the image mapping 400 in FIG. 4, the system will have to read pixels across many lines of the input buffer in order to generate a single raster-ordered line of the output 402; after every few pixels of output, the input scanner 404 must jump down to a different line. This poses a very undesirable trade-off for the designer: it is typically most efficient to process the image in output raster order, but this uneven memory access pattern ruins the performance of standard SDRAM or similar burst-oriented memory devices, crippling overall video throughput. This impact is particularly felt in SWAP-constrained systems, such as virtual reality systems with ultra-low latency requirements, tactical head-worn soldier display systems with ultra-low power requirements, or low-cost systems with low processing capacity. Such systems are often constrained in memory capacity, or in memory bandwidth for non-optimized access patterns. And the rate of growth in video bandwidth demands seems to be outpacing growth in memory bandwidth; in few short years, VR headsets will have leapt from 1080p to 8K video resolution, with no corresponding increase in memory bandwidth.

Figure 5:
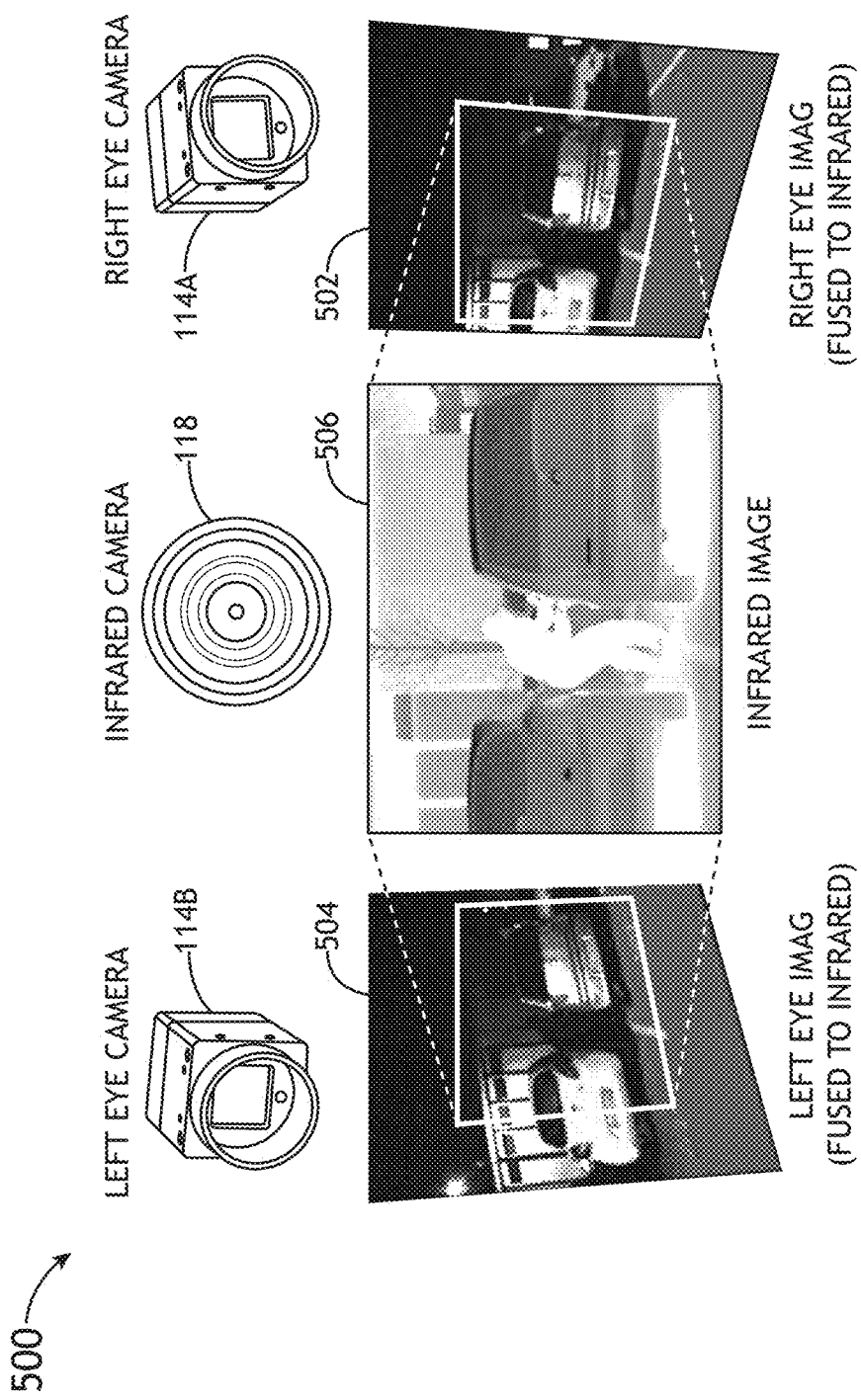
FIG. 5 illustrates examples of stereoscopic and infrared images that can be used for stereo image registration, in accordance with example embodiments of this disclosure.

The distortion correction process and architecture described herein also helps to solve a tangential problem—stereo sensor registration. Registration describes the process of skewing the output of one sensor to align to the frame of reference of another sensor, so that the datasets can be combined, or fused. When stereo vision is involved, it is common that to have monoscopic supplementary sensors—e.g. IR, LIDAR, depth sensing cameras—combined with stereoscopic primary sensors (e.g. RGB or similar electro-optical cameras). For proper data fusion, the monoscopic sensor must be registered twice to align with the left-eye and right-eye primary sensors. An example of this is shown in FIG. 5. The example system 500 has stereo RGB cameras (e.g., cameras/sensors 114A and 114B) to provide 3D vision to the user, and the system 500 also includes an additional infrared camera/sensor (e.g., depth sensor 118) that may be used to augment user vision with low-light/heat-based vision. In this case, the infrared image 506 must be separately distorted to match the field of view (e.g., image 504 and image 502) of the left-eye and right-eye RGB sensors. The data can then be fused together, to provide better situational awareness to the user. This type of registration is typically implemented as a distortion correction function, and is common to many multi-sensor vision systems. Despite the similarity of the left vs. right eye operations—both use the same source image, and often have symmetric transforms—they generally must be performed separately; this doubles the memory bandwidth demands of the system. There is a need for a better approach that leverages the parallelism in the dual registration operation to reduce that bandwidth.

In some embodiments, the distortion corrector may include components and/or configurations such as those described in U.S. patent application Ser. No. 15/060,428, which is incorporated herein by reference in its entirety. In embodiments, the distortion corrector architecture described herein further leverages parallelism in the distortion correction function to correct multiple output pixels in a single clock cycle, with minimal increase in memory bandwidth, which is critical to video throughput in SWAP-constrained/ embedded devices. This enables these types of devices to process ultra-high-resolution video signals (e.g., 8K and above) with relatively modest effort. Otherwise, embedded devices like FPGAs (common in SWAP-constrained systems) that cannot run at gigahertz-level clock rates may not keep up with these video rates. Additionally, with alternate architecting, the systems and methods described herein allow a single distortion corrector to perform stereo (or higher order) registration of a given image in a single processing pass, significantly reducing the overall computation demands of the function.

Some features of the distortion corrector architecture described herein include, but are not limited to: a novel pixel buffering/caching approach that enables multiple independent neighborhoods to be fetched in a single clock cycle, even when the pixels are not logically adjacent in memory; a dual-bank, virtual addressing scheme that ensures that "north" and "south" pixels for a given neighborhood can be simultaneously fetched; minimal increase in memory bandwidth used as compared to the original single-pixel design (assuming that the single-pixel system was still fetching multiple pixels per clock in order to output one new pixel per clock); full parameterization of the buffering scheme and the number of pixels per clock, allowing the designer to trade off lower clock frequency for logic utilization; and an alternate architecture that allows a single distortion corrector to simultaneously perform two independent distortions of the same image in a single pass ("stereo registration"), with similar efficiencies in memory bandwidth.

Figure 6A:
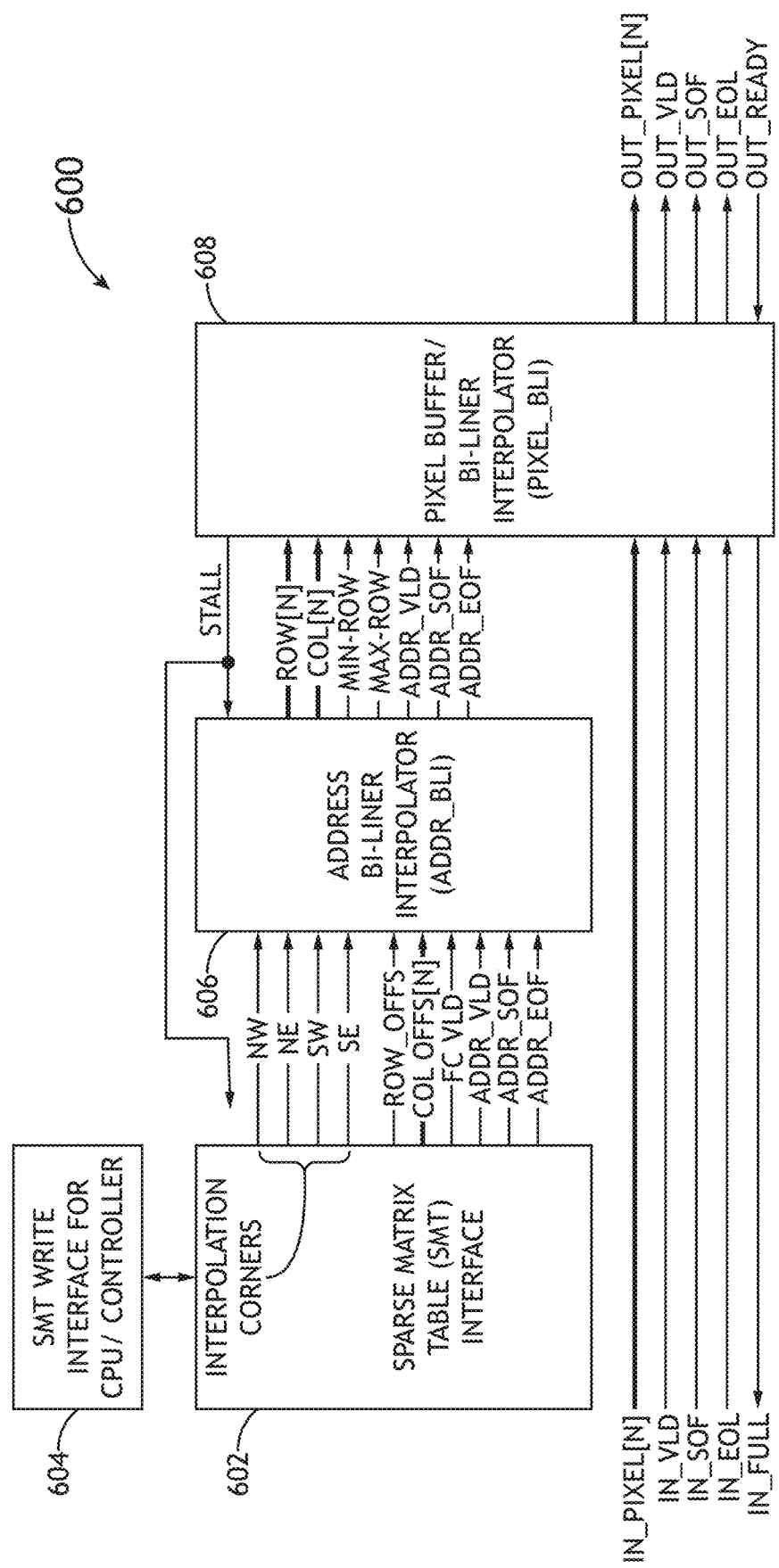
FIG. 6A is a block diagram illustrating a distortion corrector for the video processing device, in accordance with example embodiments of this disclosure.

A distortion corrector 600 is illustrated in FIG. 6A, in accordance with embodiments of this disclosure, where the distortion corrector 600 is parallelized. The video processing device may include the distortion corrector 600 (e.g., in the form of hardware, software, and/or firmware). In embodiments, the distortion corrector 600 includes a sparse matrix table 602 that includes pixel-by-pixel coordinate mappings decimated by a selected rate. For example, the distortion correction function can be programmed via a pixel-by-pixel coordinate mapping. The original table may then be decimated by a given rate, in order to save memory, designated as a "sparse matrix table" (SMT) 602. The distortion corrector 600 may include three primary functions/operational blocks: SMT interface 604, Address Bi-Linear Interpolator (ADDR_BLI) 606, and Pixel Buffer/Bi-Linear Interpolator (PIXEL_BLI) 608. These functions/operational blocks are described below.

Figure 6B:
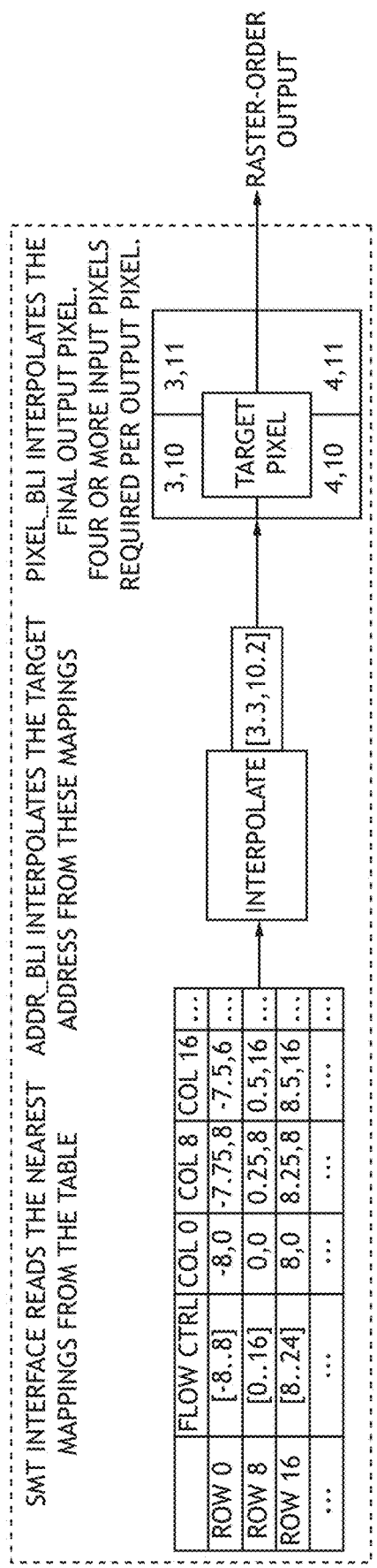
FIG. 6B illustrates a process that can be performed by the distortion corrector, in accordance with example embodiments of this disclosure.

The SMT interface 604 may be configured to fetch a subset of the coordinate mappings from the SMT 602 for interpolation. For example, in an embodiment illustrated by FIG. 6B, the SMT interface 604 accesses the table, and finds the closest coordinate mappings for interpolation. Each mapping indicates the coordinate in the input image for generating a corresponding pixel in the output image, with fractional precision to allow precise interpolation.

The ADDR_BLI 606 may be configured to calculate one or more input image coordinates for one or more pixels. For example, in the embodiment illustrated by FIG. 6B, the ADDR_BLI 606 performs interpolation, using bi-linear or other interpolation algorithms, to calculate the input image coordinate required for the current pixel(s). Effectively, this step is a decompression step, reversing the decimation of the table.

The PIXEL_BLI 608 may be configured to buffer a subset of pixels for an output image, fetch the one or more pixels based on the one or more input image coordinates, and interpolate the one or more pixels to produce one or more output image pixels. For example, in the embodiment illustrated by FIG. 6B, the PIXEL_BLI 608 buffers a subset of the image, fetches the pixels from the fractional address calculated by ADDR_BLI 606, and performs interpolation of those pixels to produce the final output pixel(s). The PIXEL_BLI 608 also enforces flow control for the system, reading flow control hints from the SMT 602 which indicate which rows of the input image need buffering to compute the current output range. Using these flow control hints, the distortion corrector stalls the input as needed so that rows of the image that are still needed for interpolation are not overwritten prematurely, and also stalls output processing if it has not received all of the image rows needed for current processing.

The distortion corrector 600 may enable the processing of multiple pixels per clock, with only a modest increase in logic resources. Most significantly, it requires little or no increase in memory bandwidth, typically the limiting factor in high-speed video systems, as compared to a typical implementation of a single-pixel pipeline. The changes to the first two stages (SMT Interface 604 an ADDR_BLI 606) are fairly pedestrian; to process N pixels per clock, these blocks mainly just replicate key logic resources by N. For example, the SMT Interface 604 increments its column counter by N instead of by 1, and outputs multiple COL_OFFS interpolation coefficients so that ADDR_BLI 606 can perform multiple interpolations of the same coordinate mappings simultaneously. ADDR_BLI 606 outputs N coordinates (row/column pairs) to the PIXEL_BLI 608 for simultaneous fetch.

The parallelization of the PIXEL_BLI 608 block is important. The pixel buffer in PIXEL_BLI 608 is a large block of memory with significant bandwidth requirements. Consequently, cookie-cutter replication of that buffer may not be feasible. Since each pixel fetch uses fractional coordinates, every output pixel generated may require the read of at least four input pixels, depending on the interpolation scheme, since the logical pixel straddles multiple physical pixels (e.g., see FIG. 6B). Thus, the parallelized version of this buffer requires 4N (or more, depending on the interpolation method) pixel reads per clock. And as discussed above, these pixel reads are generally not sequential due to the distortion patterns, making the use of SDRAM or other burst-oriented memory devices ineffective.

Figure 7A:
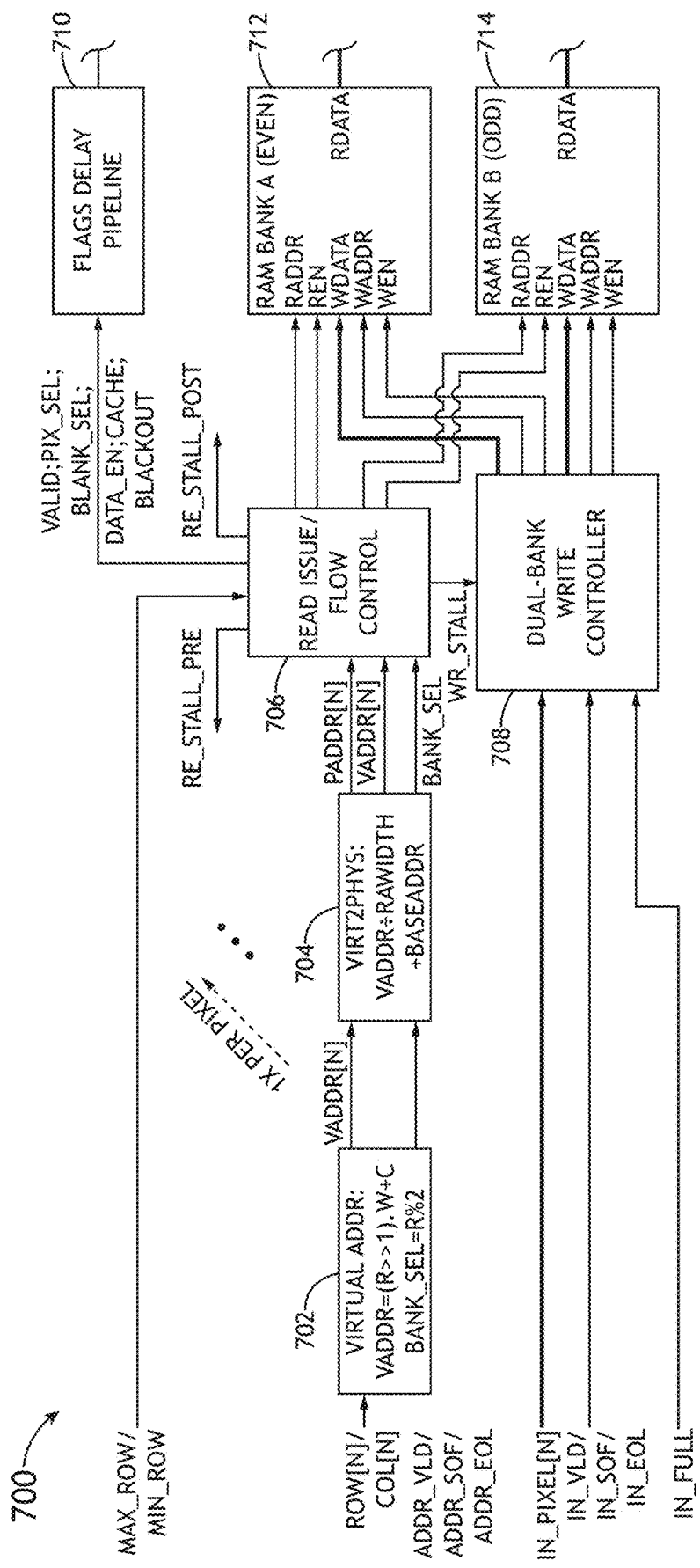
FIGS. 7A and 7B illustrate a pixel buffer for the distortion corrector, in accordance with example embodiments of this disclosure.
Figure 7B:
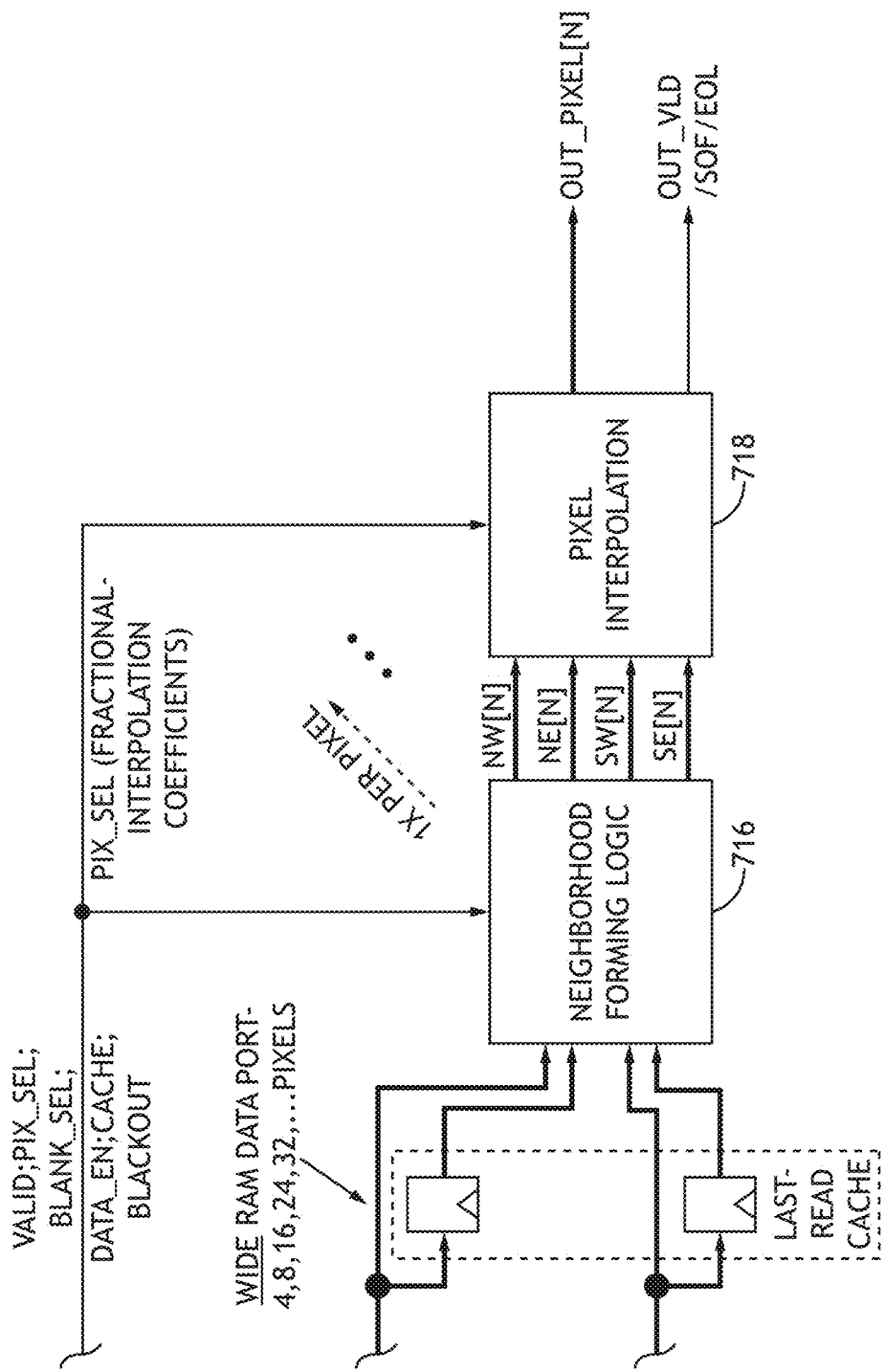

The pixel buffer 700 architecture shown in FIGS. 7A and 7B may be used to solve this parallelization problem. The key is in the dual-bank memory architecture, with wide data output ports, and the novel addressing scheme, read sequencing, caching and neighborhood forming logic that enables maximum reuse of every memory output. Wide buffer RAMs (8, 12, or even 16 pixels) were commonly used with the single-pixel architecture, because this reduced the number of extra fetches required to complete a full 4-pixel neighborhood for interpolation (reducing the clock frequency required, at the expense of a lot of wasted memory bandwidth). Therefore, adding this multi-pixel parallelization does not increase the practical memory bandwidth required very much, and does not increase the memory size requirement at all. Because the unit only needs to buffer a fraction of the total image size, it can use internal SRAM blocks in the embedded processor instead of external SDRAM; the internal RAM blocks typically support the random access required for the distortion function without the throughput penalty that external SDRAM would have.

The basic operation of the parallelized pixel buffer 700 is as follows. Data is fed into the buffer via the multi-pixel write interface 708, IN_PIXEL[N]/IN_VLD/etc. Flow control logic stalls 706 the write before image rows still in use in the interpolation get overwritten. The pixel buffer 700 is arranged in a dual bank fashion—even rows of pixels are stored to Bank A (712), and odd rows to Bank B (714). The write controller 708 maintains independent address pointers for each bank. The dual bank structure is critical—arranged as such, it ensures that for every interpolation, it can read back pixels from adjacent rows on every clock cycle. To understand this, consider the hypothetical example shown in FIG. 6B. In that example, the ADDR_BLI 606 has calculated an input coordinate of [R3.3, C10.2]. For bi-linear interpolation, the PIXEL_BLI 608 would need to fetch a four-pixel neighborhood: [R3, C10], [R3, C11], [R4, C10], [R4, C11] (referred to as the NW, NE, SW and SE pixels of the neighborhood). The dual-bank nature of the RAM ensures that row 3 and row 4 can be simultaneously accessed in a clock cycle; and, since the RAM outputs are multiple pixels wide, in most cases a full four-pixel neighborhood is fetched in a single clock cycle. Note that this approach is extensible to cover bi-cubic and other forms of pixel interpolation, possibly requiring additional RAM banks.

Asynchronously, read requests are received from the ADDR_BLI 606 via the ROW[N]/COL[N]/ADDR_VLD/ etc. interface 702 and 704. A separate ROW/COL pair is supplied on each clock cycle for every pixel to be interpolated. The buffer fully supports random-access reads—every ROW/COL pair is treated as independent, with no presumption of burst sequential reads. Because of this, and because of the dual-bank arrangement of the memory, reads require a virtual-to-physical address mapping. The virtual address may be the raster-order pixel number (row*width+column). However, each bank is independently accessed, so the least significant bit of row may be used as the bank select, and the remaining bits of (row<<1) are actually used to compute the pixel number within that bank. This is then translated to a physical address by dividing by the buffer width, in pixels, and added to a base address for the current frame. This virtual=>physical address translation logic is replicated N times for each interpolation to occur in parallel.

Figure 8:
FIG. 8 illustrates an addressing scheme for the distortion corrector, in accordance with example embodiments of this disclosure.

An example of the addressing scheme 800, and how it maps to optimal reuse of each fetch, is provided in FIG. 8. FIG. 8 assumes a 4-pixel-per-clock pipeline; hence, the ADDR_BLI 606 issues four fractional input coordinates on each cycle. FIG. 8 shows a logical layout of the pixel buffer, showing a region of interest of the image from [R2, C8] to [R5, C19], and assumes that the RAM banks are four pixels wide (indicated by thick black borders; so, for example, Bank A (712) reads row 2 columns 8-11 in a single read, and Bank B (714) reads row 3 columns 8-11 in a single read. Since the banks are independent, both reads (8 pixels total) can occur in a single clock cycle. FIG. 8 shows an example of two groups of four coordinates issued by ADDR_BLI 606 on consecutive clock cycles. Each coordinate corresponds to a four-pixel neighborhood for interpolation, indicated by the dashed lines/boxes in FIG. 8. It is noted that, in the example illustrated in FIG. 8, two coordinates in the first group share the same neighborhood.

The bottom half of FIG. 8 shows how these neighborhoods get translated to actual RAM reads, and the benefits of caching. Both banks of RAM are read on every clock cycle. The first group requires three clock cycles to fetch all four neighborhoods, due to crossing both RAM word and row boundaries; the pipeline 710 must stall the entire distortion corrector for two clock cycles to complete the four interpolations. Note however that the second group of four neighborhoods are all fetched in a single clock cycle, even though that group crosses a RAM word boundary. The pipeline 710 is not stalled for this group. This is the benefit of the caching. The pixel buffer 608/700 has a simple, single-word cache register on the output of each RAM bank. The last fetch from each coordinate group is cached, and re-used (if possible) in the next coordinate group. In this example, the buffer does not waste time re-reading [R2, C12-15]/[R3, C12-15] for the second group, since those pixels are saved in the cache. Instead, it can move ahead to the next fetch ([R2, C16-19]/[R3, C16-19]) and save a clock cycle. In this simple case, a total of eight interpolations have been fetched in four clock cycles—a 2× increase in throughput by using four output pixels per clock. In practice, this single-entry cache combined with moderate RAM widths (4 or more pixels wide) may consistently achieve 85-95% efficiency for typical distortion patterns, i.e., a 4-pixel-per-clock distortion corrector is likely to provide approximately 3.6× throughput improvement. Experimentation with these parameters will allow the designer to tune for the right combination of throughput versus resource utilization. The single-entry cache made a significant throughput difference, increasing throughput efficiency from 50-60% to the >85% level for typical designs. There would be diminishing marginal returns, but if desired the cache could be expanded to be larger than one entry, to achieve even more efficiency.

Figure 9A:
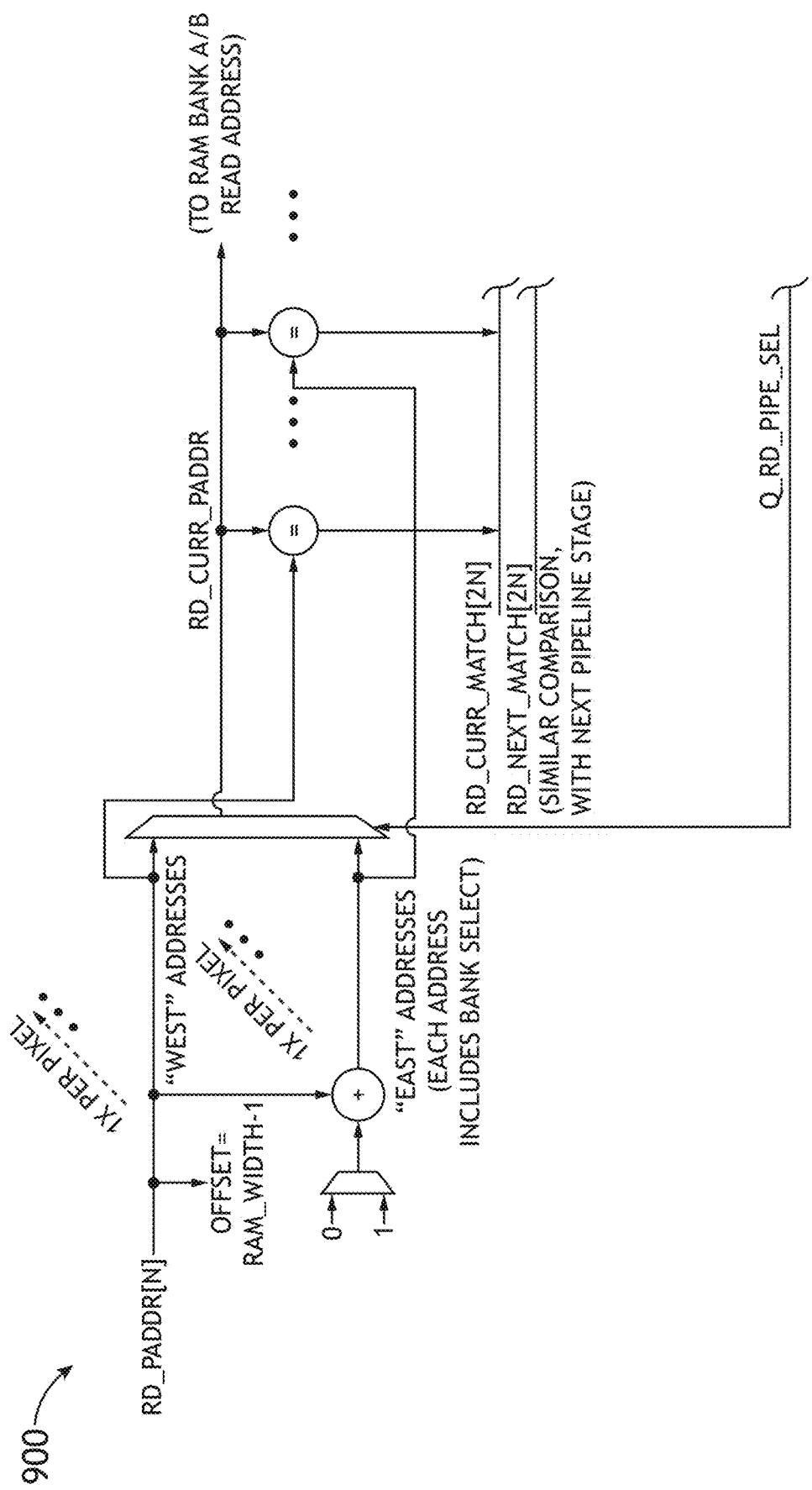
FIGS. 9A and 9B illustrate read issue logic for the pixel buffer, in accordance with example embodiments of this disclosure.
Figure 9B:
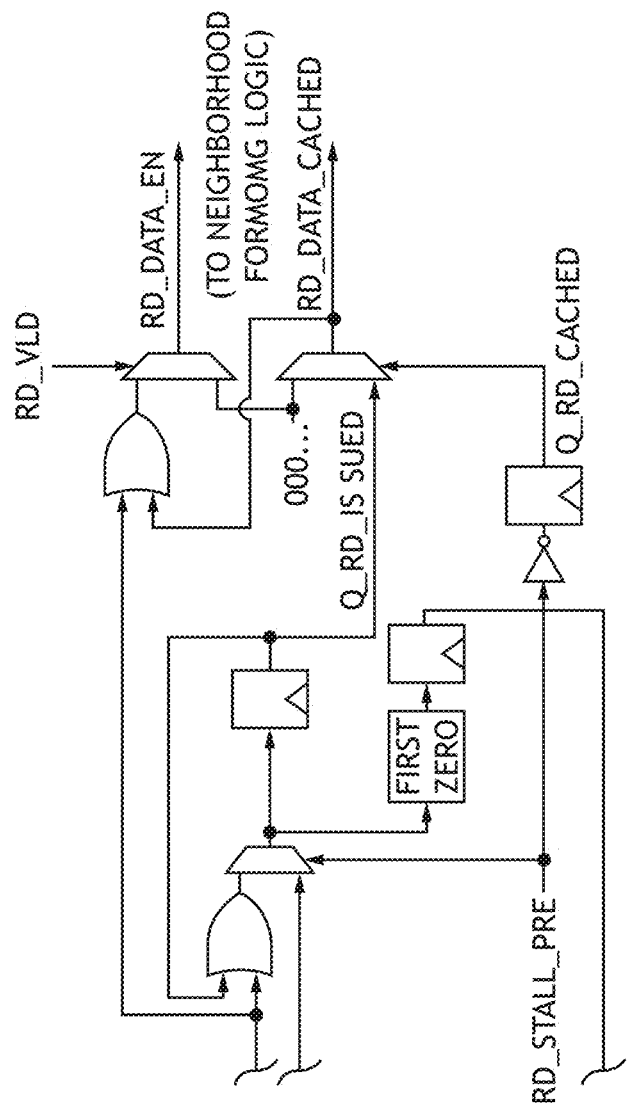

FIGS. 9A and 9B illustrate an example embodiment of read issue logic 900, which is the "brains" behind the sequencing and reuse of data reads. The read issue logic 900 considers all of the physical RAM addresses required to fetch each of the neighborhoods. A given neighborhood may straddle two RAM words (e.g., as illustrated by a First Group neighborhood of FIG. 8), so the block computes both "east" and "west" addresses for each neighborhood (east address=west address+1 if the neighborhood straddles RAM words, else east address=west address). So, for N pixels per clock, the read issuer considers 2N physical addresses. It selects one of these for the current address, and compares the "current" address to every other address. Every neighborhood pixel with a matching address (indicated by rd_curr_match) is fulfilled in the same fetch. It keeps track of which pixels have been fulfilled (q_rd_issued), and calculates which address to fetch next (q_rd_pipe_sel) based on which pixels are not yet fulfilled (neither rd_curr_match nor q_rd_issued for that address are asserted). The rd_curr_match bits are passed forward to the neighborhood forming logic 716 to indicate which neighborhood registers should capture on that clock cycle. It also indicates which registers should capture from the cache as opposed to the RAM output; these bits are set on the first clock of a new group (i.e. when the pipeline stall ended), based on which addresses match the last fetch of the previous group.

The neighborhood forming logic 716 receives the pixel data from the dual RAM banks 712 and 714 and dual cache registers, plus pipelined flags 710 that indicate how it is to be processed. Each neighborhood has four pixel registers, NW, NE, SW and SE, indicating the relative position of each pixel in the neighborhood (this design can expand with more pixel registers to support bi-cubic or other interpolation methods). These registers are updated on each clock cycle based on several layers of nested multiplexing. Based on the bank-select, the registers align to either the Bank A (712) or Bank B (714) output. For even row addresses, the NW and NE registers draw from Bank A (712) (either directly or via cache), and SW/SE draw from Bank B (714). For odd row addresses, the reverse is the same. Based on the caching information in rd_data_cached, the registers multiplex between the RAM data direct output and the cache registers. Based on the pixel offset derived from the physical address, the registers multiplex between the individual pixels in the selected RAM/cache word. It also selectively blacks out pixels that were either from out-of-bounds addresses, or which had already been overwritten in the buffer. Based on the data enables in rd_data_en, the registers decide whether to capture or retain their previous state.

Having correctly sorted all of the RAM/cache output pixels into neighborhood registers, the remaining step is to interpolate each neighborhood (block 718). This is accomplished in PIXEL_BLI 608/700 using simple replication of logic. The resulting N-pixel-wide distorted output is then passed onto the next stage.

Using this approach, the distortion corrector 600 has already been successfully demonstrated to parallelize to 8 pixels per clock with reasonable logic utilization, and could likely be parallelized even further. This allows SWAP-optimized embedded devices such as FPGAs to easily perform this processing for even ultra-high 8K resolution displays while running at clock rates <200 MHz, a very comfortable frequency range to design for modern devices.

With a slight re-architecting, this multi-pixel-per-clock distortion corrector 600 can be repurposed for solving a different class of problems, for example, stereo sensor registration, as illustrated previously in FIG. 5. In this configuration, a single distortion corrector could simultaneously perform the registration of a single IR image to stereo RGB images in one pass. A key feature of the parallelized pixel buffer is the fact that each coordinate passed from ADDR_BLI 606 to PIXEL_BLI 608 is treated as independent, with full random-access. This feature makes the stereo registration function possible. This seems like a natural application of the inventive techniques described herein because of the significant similarities in performing the left-eye vs. right-eye distortions. In particular, if the two registrations were performed simultaneously by two parallel distortion correctors, the two correctors would likely just be buffering the same source data twice. The inventive techniques described herein allow the IR to be simultaneously registered to both eyes out of a single PIXEL_BLI.

Figure 10:
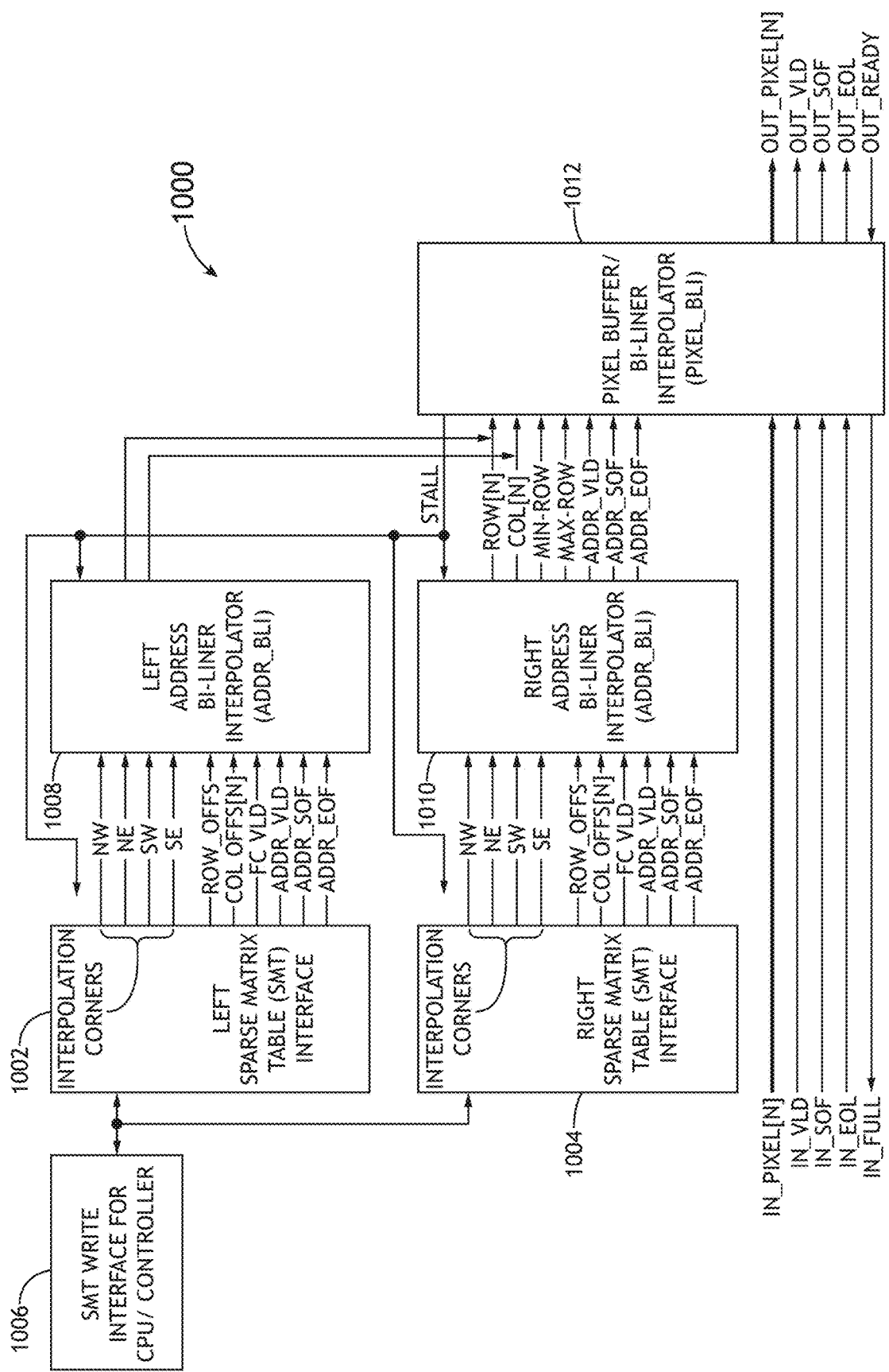
FIG. 10 is a block diagram illustrating a distortion corrector for the video processing device, in accordance with example embodiments of this disclosure.

FIG. 10 illustrates another embodiment of a distortion corrector 1000 with similar components having similar function to those of the distortion corrector 600 described above; however, in the embodiment shown in FIG. 10, each eye gets its own distortion table (e.g., SMTs 1002 and 1004), and its own SMT Interface 1006 to read it. There is also a separate ADDR_BLI per eye (e.g., ADDR_BLIs 1008 and 1010), each interpolating the target addresses for each eye's distortion. The ROW, COL outputs from both ADDR_BLIs 1008 and 1010 are aggregated and passed to the PIXEL_BLI 1012. The design can still take advantage of the multi-pixel-per-clock capability of these blocks; for example, the ADDR_BLIs 1008 and 1010 can still issue multiple simultaneous fetches per eye. The PIXEL_BLI 1012, because it is combining the ADDR_BLI outputs for both eyes, must be set to have 2× the pixels-per-clock of the other blocks. Because the PIXEL_BLI 1012 can process the ROW, COL addresses from each ADDR_BLI independently, it can reuse the data stored in its buffer to perform both distortions independently. If there is significant parallax in the images, this approach will probably not provide much speed up vs. just performing the two distortions sequentially. For example, it may not benefit much from the caching/reuse capabilities of the read issue logic and may end up spending separate clock cycles for most or all left vs. right eye fetches. However, this approach can reduce logic and memory utilization by up to 50%. If, on the other hand, there is a small amount of parallax and good camera alignment, the read issue logic of PIXEL_BLI 1012 will take better advantage of the parallelism, and provide a bandwidth increase in addition to the reduction in logic resources.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A mixed reality system, comprising:
   a computer system configured to generate a virtual reality video stream;
   a head mounted device communicatively coupled to the computer system; the head mounted device including:
   a display;
   a depth sensor;
   and
   a stereoscopic camera system;
   and
   a video processing device communicatively coupled to the computer system and the head mounted device, the video processing device configured to:
   generate a first depth map based on time-of-flight measurements detected by the depth sensor;
   generate a second depth map based on disparity mapping from stereo imagery detected by the stereoscopic camera system;
   determine confidence values for respective pixel locations in the first depth map and the second depth map based on texture recognition;
   blend the first depth map and the second depth map into a combined depth map based on the confidence values of the respective pixel locations in the first depth map and the second depth map;
   and
   combine the virtual reality video stream and the stereo imagery detected by the stereoscopic camera system based on the combined depth map and depth criteria encoded into the virtual reality video stream.

2. The mixed reality system of claim 1, wherein the video processing device is coupled to or integrated within the head mounted device.

3. The mixed reality system of claim 1, wherein the video processing device is further configured to:
   downsample the stereo imagery before generating the second depth map; and
   upsample the combined depth map to a resolution of the virtual reality video stream before combining the virtual reality video stream with the stereo imagery detected by the stereoscopic camera system.

4. The mixed reality system of claim 1, wherein the video processing device is further configured to merge the combined depth map with optical cues from the stereo imagery detected by the stereoscopic camera system for accurate extraction of identified foreground objects based on distance.

5. The mixed reality system of claim 1, wherein the computer system is configured to encode the depth criteria into the virtual reality video stream, and the video processing device is configured to decode the depth criteria from the virtual reality video stream, thereby enabling use of commercial-off-the-shelf (COTS) virtual reality hardware and software without modification.

6. The mixed reality system of claim 1, wherein the video processing device is further configured to perform distortion correction on the stereo imagery before combining the virtual reality video stream with the stereo imagery detected by the stereoscopic camera system.

7. The mixed reality system of claim 6, wherein the video processing device is configured to perform the distortion correction with a distortion corrector including:
  a sparse matrix table including pixel-by-pixel coordinate mappings decimated by a selected rate;
  a sparse matrix table interface configured to fetch a subset of the coordinate mappings from the sparse matrix table for interpolation;
  an address bi-linear interpolator configured to calculate one or more input image coordinates for one or more pixels; and
  a pixel buffer configured to buffer a subset of pixels for an output image, fetch the one or more pixels based on the one or more input image coordinates, and interpolate the one or more pixels to produce one or more output image pixels.

8. The mixed reality system of claim 7, wherein the one or more input image coordinates for the one or more pixels are fractional coordinates.

9. The mixed reality system of claim 7, wherein each output image pixel is based on at least four input image pixels.

10. A video processing device for a mixed reality system, the video processing device comprising a controller configured to:
  generate a first depth map based on time-of-flight measurements detected by a depth sensor of a head mounted device;
  generate a second depth map based on disparity mapping from stereo imagery detected by a stereoscopic camera system of the head mounted device;
  determine confidence values for respective pixel locations in the first depth map and the second depth map based on texture recognition;
  blend the first depth map and the second depth map into a combined depth map based on the confidence values of the respective pixel locations in the first depth map and the second depth map; and
  combine a virtual reality video stream with the stereo imagery detected by the stereoscopic camera system based on the combined depth map and depth criteria encoded into the virtual reality video stream.

11. The video processing device of claim 10, wherein the controller is further configured to:
  downsample the stereo imagery before generating the second depth map; and
  upsample the combined depth map to a resolution of the virtual reality video stream before combining the virtual reality video stream with the stereo imagery detected by the stereoscopic camera system.

12. The video processing device of claim 10, wherein the controller is further configured to merge the combined depth map with optical cues from the stereo imagery detected by the stereoscopic camera system for accurate extraction of identified foreground objects based on distance.

13. The video processing device of claim 10, wherein the depth criteria is encoded into the virtual reality video stream by a communicatively coupled computer system, and the controller is configured to decode the depth criteria from the virtual reality video stream after receiving the virtual reality video stream from the computer system, thereby enabling use of commercial-off-the-shelf (COTS) virtual reality hardware and software without modification.

14. The video processing device of claim 10, wherein the controller is further configured to perform distortion correction on the stereo imagery before combining the virtual reality video stream with the stereo imagery detected by the stereoscopic camera system.

15. The video processing device of claim 14, wherein the controller is configured to perform the distortion correction with a distortion corrector including:
  a sparse matrix table including pixel-by-pixel coordinate mappings decimated by a selected rate;
  a sparse matrix table interface configured to fetch a subset of the coordinate mappings from the sparse matrix table for interpolation;
  an address bi-linear interpolator configured to calculate one or more input image coordinates for one or more pixels; and
  a pixel buffer configured to buffer a subset of pixels for an output image, fetch the one or more pixels based on the one or more input image coordinates, and interpolate the one or more pixels to produce one or more output image pixels.

16. The video processing device of claim 15, wherein the one or more input image coordinates for the one or more pixels are fractional coordinates, and wherein each output image pixel is based on at least four input image pixels.

17. The video processing device of claim 15, wherein the pixel buffer is configured with a dual-bank, virtual addressing scheme that enables multiple independent neighborhood fetches of pixels in parallel.

* * * * *